United States Patent
Ysteboe et al.

[11] Patent Number: 5,946,848
[45] Date of Patent: Sep. 7, 1999

[54] FISHING LURE BIB SYSTEM

[75] Inventors: Howard T. Ysteboe, New Cumberland; Cheryl Sipple, Lewiston, both of Pa.

[73] Assignee: Possum Lures, Inc., Lewistown, Pa.

[21] Appl. No.: 08/942,818

[22] Filed: Oct. 2, 1997

[51] Int. Cl.⁶ ................................................ A01K 85/00
[52] U.S. Cl. ...................... 43/42.53; 43/42.15; 43/42.24; 43/42.47
[58] Field of Search .................. 43/42.53, 42, 42.11, 43/42.15, 42.24, 42.45, 42.47, 42.03, 42.39; 264/254, 277, 279, 328.7, 328.8

[56] References Cited

U.S. PATENT DOCUMENTS

| | | | |
|---|---|---|---|
| 1,499,819 | 7/1924 | Goble | 43/42.15 |
| 2,776,518 | 1/1957 | Felmlee | 43/42.24 |
| 2,847,791 | 8/1958 | Simmons | 43/42.39 |
| 2,938,293 | 5/1960 | Richardson | 43/42.24 |
| 2,971,285 | 2/1961 | Murawski | 43/42.15 |
| 3,070,917 | 1/1963 | Rowe, Sr. | 43/42.24 |
| 3,191,336 | 6/1965 | Cordell, Jr. | 43/42.53 |
| 3,218,750 | 11/1965 | Lewin | 43/42.45 |
| 3,367,060 | 2/1968 | Abercrombie | 43/42.53 |
| 3,490,165 | 1/1970 | Thomassin | 43/42.09 |
| 3,514,358 | 5/1970 | Monaghan et al. | 43/42.53 |
| 3,611,614 | 10/1971 | Ward | 43/42.24 |
| 3,735,518 | 5/1973 | Klein et al. | 43/42.04 |
| 3,861,073 | 1/1975 | Thomassin | 43/42.24 |
| 4,196,884 | 4/1980 | Zeman | 43/42.39 |
| 4,228,611 | 10/1980 | McGahee | 43/42.53 |
| 4,437,257 | 3/1984 | Kluge | 43/42.53 |
| 4,654,995 | 4/1987 | Rapelje | 43/42.15 |
| 4,771,567 | 9/1988 | Cannon | 43/42.39 |
| 4,864,766 | 9/1989 | Bohn | 43/42.53 |
| 5,142,811 | 9/1992 | Freeman | 43/42.53 |
| 5,193,299 | 3/1993 | Correll et al. | 43/42.24 |
| 5,564,220 | 10/1996 | Blicha | 43/42.53 |
| 5,661,921 | 9/1997 | Mason | 43/42.47 |
| 5,678,350 | 10/1997 | Moore | 43/42.15 |
| 5,725,892 | 3/1998 | Gibbs | 43/42.53 |
| 5,815,978 | 10/1998 | Huddleston | 43/42.39 |

FOREIGN PATENT DOCUMENTS

| | | | |
|---|---|---|---|
| 2145083 | 2/1973 | France | 43/42.24 |
| 2652991 | 4/1991 | France | 43/42.24 |
| 4236848 | 4/1994 | Germany | 43/42 |
| 206378 | 10/1939 | Switzerland | 43/42.45 |

*Primary Examiner*—Michael J. Carone
*Assistant Examiner*—Darren Ark
*Attorney, Agent, or Firm*—C. Emmett Pugh; Pugh/Associates

[57] ABSTRACT

An exteriorly soft body fishing lure (1) including an internal, insert member (200, 300, 400) to which are integrally attached two eyelets (210A/B, 310A/B, 410A/B) and a bib member (220, 320, 429). The insert is generally flat, having at least in part a triangular shape when viewed from its sides (FIGS. 2A, 3A, 4A), but with a strengthening rib (202, 302, 402) extending about its periphery. The bib extends down at an exemplary angle within the range of about forty-nine to about sixty-five (~49–65°) degrees from the "horizontal." The integrally formed bib is extended in its longitudinal dimension, with a somewhat flattened or oblong, i.e., a non-circle but nonetheless curved, leading end, tapering out to a small radii (224, 324, 424) along its rear side's peripheral edge (FIGS. 2E & 2F, 3F & 3E, 4F & 4E). The main, extended body (225, 325, 425) of the bib has an exemplary, preferred thickness in its interior within a range of about eighty-five thousandths to about one-tenth (0.085–0.1") of an inch. The lure is made in a two step process of initially hard molding and integrating together the wire forms, insert and bib surrounded and held together by the set, hard plastic in a rigid, skeleton piece 8 and then over-molding the rigid skeleton piece into the soft body plastic body produced in a second molding step, producing the highly advantageous, jointed body fishing lure 1 of the invention.

9 Claims, 5 Drawing Sheets

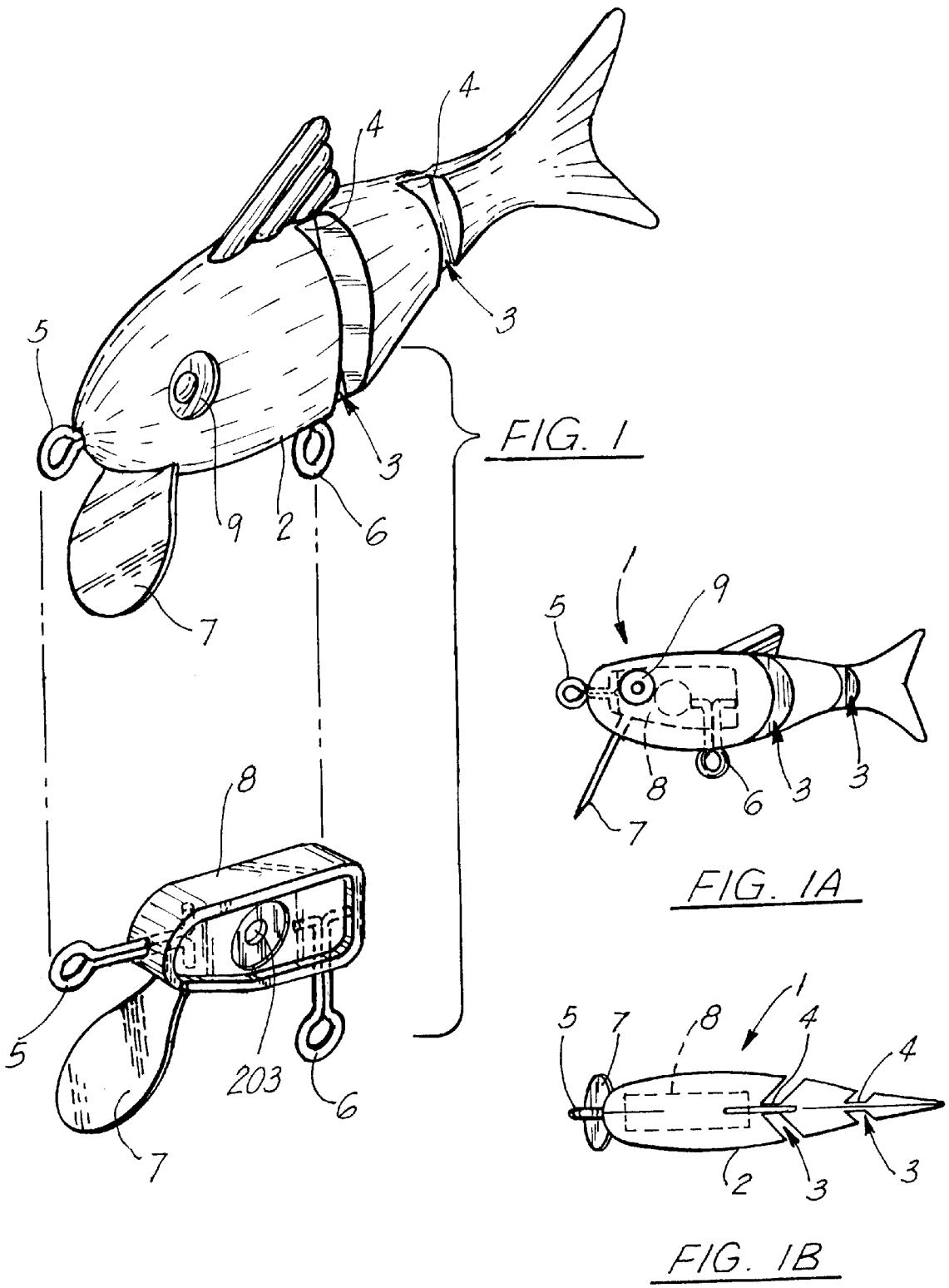

FISHING LURE BIB SYSTEM

TECHNICAL FIELD

The present invention relates to fishing lures and more particularly to the internal insert, bib and eyelet structures therefor and the manufacturing of the lures, particularly of the internal insert, associated bib and eyelet internal elements of the lure, as well as the external body of the lure.

BACKGROUND ART

Fishing lures are well known in the art for use as artificial "bait" to lure fish to the hook for catching the fish. Fishing lures of many types are available to the art.

Some exemplary prior art references are listed below:

| Patent No. | Inventor | Issue Date |
|---|---|---|
| 3,490,165 | Thomassin | 01/20/70 |
| 3,735,518 | Klein et al | 05/29/73 |

Reference is also had to Australian patent application No. 36665/95 filed Nov. 7, 1995 entitled "Improvements to Fishing Lures" of Blockridge Pty. Ltd. and Australian provisional patent application No. PM9273 filed Nov. 7, 1994, upon which the former claimed priority.

Generally a lure includes a main, exterior body portion, which is of the general shape of a bait fish or other marine animal desired to attract other fish. The main body may be colored or treated in such a way as to attract fish and usually incorporates one or more eyelets or the like to which the fishing line and fishing hook(s) may be attached. The lure typically includes at its leading, lower end a "bib" which assists in the lure reaching a desired submerged level or water depth. The bib also contributes to the over-all movement or "swim" of the lure to attract the game fish.

The Australian Blockridge application noted above described a fishing lure including a body portion having substantially the configuration of the body of a fish or other marine animal, with the body portion being formed of a flexible or pliable material and having a plurality of slots in opposite sides, with the slots defining therebetween respective sections of the body portion, the section being capable of deflection to opposite sides upon movement of the lure through water. The slots in opposite sides of the body portion defined respective aligned thin web sections extending centrally along the body portion. The thin web sections were aligned with what would be the normal backbone of a fish. The thin web sections, in effect, acted as "hinges" between the body sections, and the slots were of such a width that allowed hinged movement of one section relative to the other, adjacent section(s).

The body portion was provided with a recess at the leading or head end thereof, for receipt of a bib carrying insert. The insert also included means for retaining a hook and means for connection of the insert and thus the body portion to a fishing line or the like. Such means were in the form of a clip releasibly received by the insert, which was weighted. As an alternative, the insert was molded with the head or leading end of the lure, with the bib releasibly engaged with the insert.

The body portion was formed of a flexible plastics material, such as plasticized, poly-vinyl-chloride (PVC) or silicon formed by injection molding. The bib was formed of plastics, suitably transparent plastics such as polycarbonate.

Thus, prior art lures typically included a separable bib and separate insert structure for providing an inter-connection between the fishing line and the body of the lure into which the insert is located, as well as the hook to which it was directly connected. The insert of the prior art thus provided a strong interconnection between the line connector and the hook connector, while also serving, in part, as an internal "skeleton" for the lure body, which typically is molded of softer or weaker material, which, in turn, is molded or shaped to simulate the body of a desirable "bait."

Exemplary problems of the prior bib structure, particularly the "Blockridge" lure, which in its commercial embodiment included a stainless steel plate with an inserted or pushed on bib, were that the bib was not stable, and broke or fell out too easily or was too easily bent. Additionally, such a lure was not stable when pulled through the water, and, also, some fishermen did not like having a metal plate for the attachment of the line and hook(s).

In a first test attempt in early 1997 at improving the prior bib structure to overcome these problems, a plastic bib structure was used with screw hook eyes installed to which was attached the fishing line and hooks. However, problems with this approach included too high manufacturing costs and too much time required to individually "tune" the lure.

"Tuning" refers to the bending of the basic elements of the lure, for example, the inter-connecting parts of the bib with respect to the line connection and/or the hook connection, relative to one another, so that the lure travels in a desired direction, for example, a relatively straight line. Some minor tuning is expected for most, if not all, lures and typically is done by the fisherman. However, the screw eye interconnections made the lure very unpredictable and unstable.

The present invention successfully overcomes all of the foregoing prior problems.

GENERAL SUMMARY DISCUSSION OF INVENTION

Hence, the present invention provides a novel fishing lure and bib therefor which overcomes the prior art bib, hook/line attachment and lure problems noted above.

In the present invention the bib and associated elements or members for the fishing lure body were redesigned to include in the internal insert mold both the downwardly extending bib and the line tie and hook attachment eyelets, preferably in the form of wire forms, which bib design was further improved by tapering the bib around its sides to a small radius or radii on its peripheral edges, producing preferably slanted side edges effectively or relatively going down to a point or line edge area about the bib periphery, in contrast to the flat, full-thickness, squared edges of the prior art bibs. These approaches produce a lure that, for the most part, does not require any (or very little) individual tuning.

Additional improvements includes a new eyelet design which eliminates the possibility of getting the open end of the previous eye to attach the line or hook. This further improvements makes the connection operation virtually "fool proof."

A further, optional improvement is the addition of a strengthening rib around the edge of the insert member.

In manufacturing the lure of the present invention, the initial steps include in the preferred embodiment the insert molding of, for example, "omega" type metal inserts or wire forms in thermoplastic material for the eyelets, producing an interim, relatively rigid, internal member, including both the insert and integrally formed and molded bib, which rigid internal member is then subsequently insert molded into, for example, a thermoset plastisol material, or, for further example, a low durometer, thermoplastic elastomer material, producing the relatively soft, outer or exterior lure body, with the downwardly extending bib and the eyelets extending outside of the exterior lure body.

It is believed that the present invention is the first to insert mold hook and tie eyes in, for example, a hard thermoplastic, producing a combined, integrated insert and bib with integrated eyelets, and then to insert mold this improved insert/bib/eyelet assembly into, for example, a very low durometer plastic for simulating the outer, soft body of the fishing lure.

As in known in the art, various colors and decoration can be added to the resin before molding the final lure, as is likewise done in many lures today.

If so desired, a series of same size lures having different sized bibs can be made for producing different depths of "swim" of the individual lures, along with a series of different size lures, e.g. two, three and four (2", 3" 4") inch lures.

These innovations are preferably, but not necessarily, incorporated into a lure with a "jointed" body, with its incorporated, integrated, bib, hook and towing system surrounded by a desirable soft body shape, which provides a "real, life-like" appearance as its "swims" through the water, providing, it is believed, the most realistic action and feel of any lure on the market.

The incorporated bib, hook and towing system of the present invention generally creates a similarity to hard body lures on the market today, but its life-like "swimming" action of the soft body lure of the preferred embodiment of the invention is so realistic that one can "swim" the lure of the invention besides a real bait fish and effectively not be able to tell the difference between the two, making the lure of the invention, it is believed, one of the most natural, artificial baits on the market today.

It is thus an object of the present invention to provide a lure which at least generally does not require individual "tuning" after manufacture, but does allow, if so desired, some adjustment in use to adapt the lure to provide various actions depending on the needed application of the lure.

It is a further object of the present invention to provide an improved fishing lure and bib structure therefor which produces a very "life-like" swimming action.

It is a still further object of the present invention to provide a lure which over-comes the prior art problems noted above using a manufacturing methodology which preferably includes the initial step of insert molding metal inserts into thermoplastic material, which forms an integrated, rigid structure, and the subsequent step of insert molding the initial, rigid structure into preferably a soft body molded material, such as, for example, a thermoset plastisol material or a very low durometer type thermoplastic material.

BRIEF DESCRIPTION OF DRAWINGS

For a further understanding of the nature and objects of the present invention, reference should be had to the following detailed description, taken in conjunction with the accompanying flow chart, wherein:

FIG. 1 is a front, perspective, "exploded" view of the complete fishing lure of the exemplary embodiments of the present invention, with the first embodiment (FIGS. 2A—2F) of the separately molded insert shown below the exterior body of the lure.

FIGS. 1A & 1B are side and top/plan views, respectively, of a complete fishing lure showing the over-all general arrangement of parts generally followed in the exemplary embodiments of the present invention, although it is noted that the detailed views of the remaining figures illustrate more accurately and in greater detail the exemplary dimensions and configurations of the bib and insert elements actually used in the exemplary embodiments of the present invention.

FIG. 2D is a rear view of the combined, initially and integrally molded, bib and insert elements of the embodiment of FIG. 2A, with the integrated, rear eyelet (in side, edge view) being visible; while

FIG. 3D is a rear view of the combined, initially and integrally molded, bib and insert elements of the embodiment of FIG. 3A, with the integrated, rear eyelet (in side, edge view) being visible; while

FIG. 4D is a rear view of the combined, initially and integrally molded, bib and insert elements of the embodiment of FIG. 4A, with the integrated, rear eyelet (in side, edge view) being visible; while

EXEMPLARY MODES FOR CARRYING OUT THE INVENTION

Figure 2B:
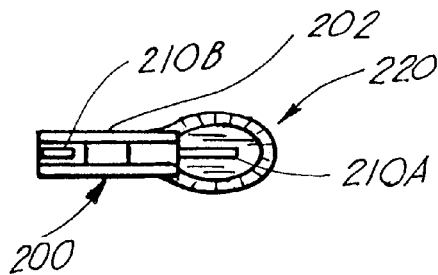
FIG. 2B is a bottom edge view of the insert embodiment of FIG. 2A.

General Lure of FIGS. 1A & 1B

As can be seen in FIGS. 1A & 1B [which include exemplary, over-all dimensions for an exemplary two (2") inch "minnow"], the exemplary embodiment of the over-all fishing lure 1 of the present invention includes a molded plastic body 2 having a series of an exemplary, two sets of opposed slots 3 connected by relatively thin web portions 4. The slots 3 and web portions 4 combine to form effectively "hinged" body sections, which move relatively to one another as the lure "swims," greatly adding to the life-like action of the lure 1. Thus, there is at least one, opposed set of slots 3 (two sets being illustrated) in the sides of the lure body 2, producing a central, thin web 4 between each set of opposed slots, serving effectively as a "hinge" between the adjacent, in-line parts of the lure body for an enhanced "swimming" action for the lure 1 as it is pulled through the water.

A pair of "eyes" 9 are included on either side of the body 2 for enhanced visual simulation, while the body typically will be colored or ornamental adorned, as is well known in the fishing lure art.

At the front end of the lure body 2 is a first eyelet 5 to which the fisherman attaches the towing or pulling line (not illustrated), while a second eyelet 6 is included at the body's bottom for the attachment of a hook (not illustrated), all as well known in the prior art. A downwardly inclined, attached bib 7 is included at the bottom, front end of the body 2. As will be better understood from the description of the other, detailed drawings below, the eyelet structures 5 & 6 and the bib 7 are integrally attached to insert member 8, the latter of which in essence forms the "skeleton" of the lure 1.

[Exemplary dimensions for the body 2 and fish eye 9 are included in FIGS. 1A & 1B, which dimensions are incorporated herein by reference.]

Bib/Insert Embodiment of FIGS. 2A–2F

Figure 2D:
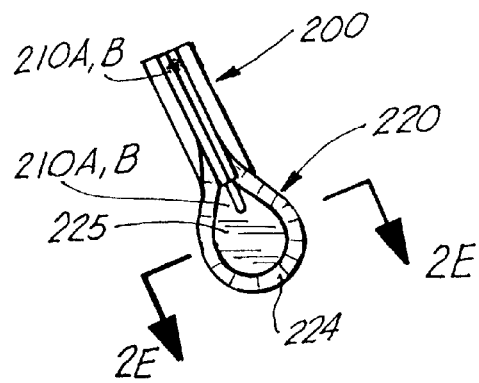
Figure 2A:
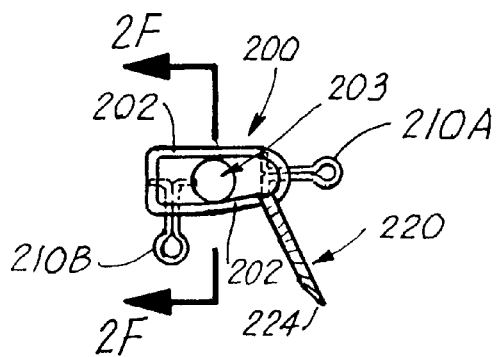
FIG. 2A is a side view of the combined bib, eyelet and insert members of a first exemplary embodiment of the bib/insert structure of the present invention which can used within the generalized lure of FIGS. 1A & 1B.

With reference to FIGS. 2A–2F, the first, exemplary insert member 200 of the present invention includes two eyelets 210 and a bib member 220. The insert member 200 is generally flat, having preferably an over-all triangular shape or other appropriate shape with a squared-off base when viewed from its sides as seen in FIG. 2A, but with a strengthening rib 202 (note FIG. 2F) extending along and about its periphery. The insert member 200 is generally extended in the longitudinal direction, with the first eyelet 210A at its front end "nose" or tip and the second eyelet 210B at its bottom toward its rear end. The bib member 220 extends down at an exemplary angle of sixty-five (65°) degrees from the "horizontal." The main body of the insert member 200 includes a hole 203, through which the final over-molded plastic passes in the second, over-molding step, as explained more fully below.

Figure 2E:
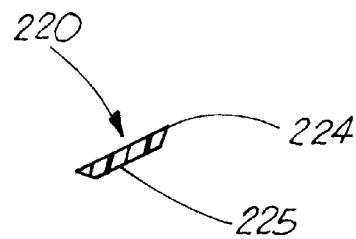
FIG. 2E is a cross-sectional view of the bib element or portion, taken along section lines A—A of FIG. 2D, at the maximum width area of the bib element.
Figure 2F:
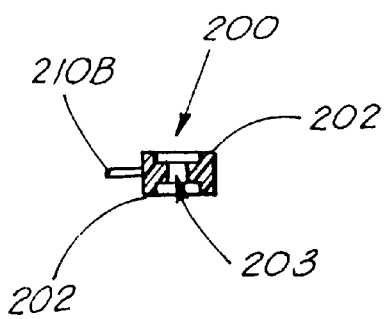
FIG. 2F is a cross-sectional view of the insert element at its approximate mid-section, taken along section lines B—B of FIG. 2A, of the embodiment of FIG. 2A.
Figure 2C:
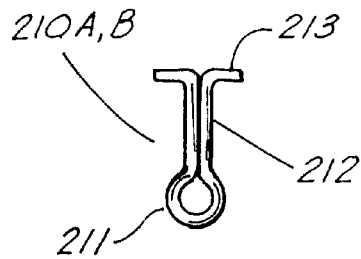
FIG. 2C is side, close-up view of an exemplary, eyelet wire form used for the hook and line attachments for the generalized lure of FIGS. 1A & 1B and assembled within the bib/insert embodiment of FIG. 2A.

As can best be seen in FIG. 2C, the eyelets 210A, 210B each includes a distal, terminus ring 211, an extended base or stem 212 and proximal, terminus "feet" 213, all preferably integrally formed from a continuous wire form. Thus, for this continuous wire form, a wire is bent about itself to form a circle or terminus ring 211 at its distal end to which a hook or line can be easily attached and held, going into two, side-by-side wire sections producing the extended base or stem 212, terminating in the proximal, terminus, preferably orthogonal "feet" 213.

As can best be seen in FIG. 2D, the bib member 220, which is integrally formed with the insert 200, includes a forward, curved portion or "bib," which interacts with the water flow to cause the lure 1 to travel at a desired depth, depending on, for example, what particular angle it makes with respect to the general line of travel, which typically would be along the center line of the lure body 2.

As likewise can be seen in FIG. 2D, the bib member 220 is extended in its longitudinal dimension, with a somewhat flattened or oblong (i.e., non-circle), curved leading end tapering out to a small radii 224 along its peripheral edge (note FIG. 2E), producing a slanted side edge terminating in a peripheral line, in contrast to the flat bib with the flat, ninety (90°) degree or squared-off side edges of the prior art. As also can be seen in FIG. 2E, the front side of the bib preferably is flat, while the back side has the side edges tapering to a thin, preferably a line edge. The main, extended body 225 of the bib member 220 has an exemplary, preferred thickness in its interior 225 of about eighty-five thousandths (0.085") of an inch at its thickest point, believed to be substantially less than that of the plastic bibs of the prior art.

In the initial manufacturing assembly of the components of the combined bib/insert structure 200/210/220, the wire forms for the eyelets 210A & 210B are placed into pre-formed areas of the mold for the integrated insert member or portion 200 and the bib member or portion 220 to be molded together as an integrated whole. As explained more fully below, the wire form members are initially assembled and integrated together into the insert and bib 200/220 in an initial molding step using insert molding preferably with a thermoplastic, which assemblage is then subsequently preferably molded into a soft plastic body in the desired form or fish configuration 2.

[Exemplary dimensions for the insert member 200, the eyelets 210 and the bib member 220 are included in FIGS. 2A–2F, which dimensions are incorporated herein by reference.]

Bib/Insert Embodiment of FIGS. 3A–3F

Figure 3B:
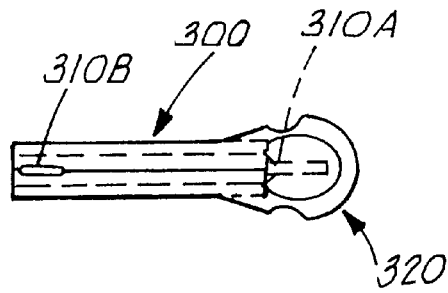
FIG. 3B is a bottom edge view of the insert embodiment of FIG. 3A.
Figure 3F:
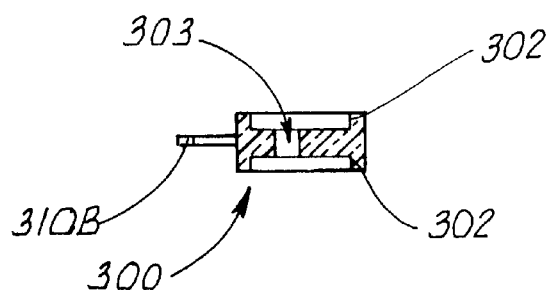
FIG. 3F is a cross-sectional view of the insert element at its approximate mid-section, taken along section lines B—B of FIG. 3A, of the embodiment of FIG. 3A.
Figure 3A:
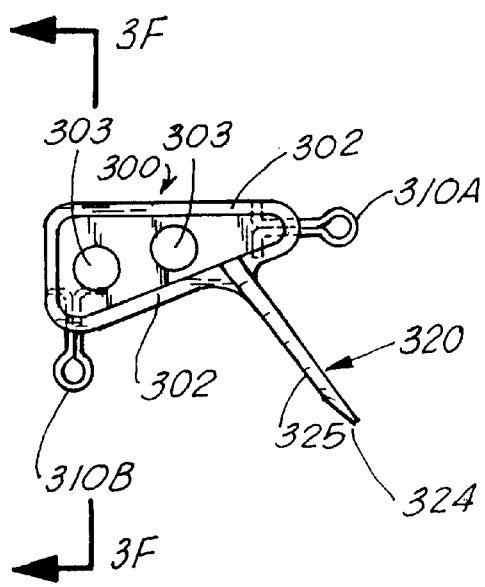
FIG. 3A is a side view of the combined bib, eyelet and insert members of a second, alternative, exemplary embodiment of the bib/insert structure of the present invention which can used within the generalized lure of FIGS. 1A & 1B.

With reference to FIGS. 3A–3F, a second, alternative, exemplary insert member 300 of the present invention also includes two eyelets 310 and a bib member 320. The insert member 300 is generally flat, having an exemplary, over-all triangular shape when viewed from its sides as seen in FIG. 3A, but with a strengthening rib 302 (note FIG. 3F) extended along and about its periphery. The insert member 300 is generally extended in the longitudinal direction, with the first eyelet 310A at its front end "nose" or tip and the second eyelet 310B at its bottom toward its rear end. The bib member 320 extends down at an exemplary angle of fifty-five (55°) degrees from the "horizontal." The main body of the insert member 300 includes holes 303, through which the final over-molded plastic passes in the second, over-molding step, as explained more fully below.

Figure 3D:
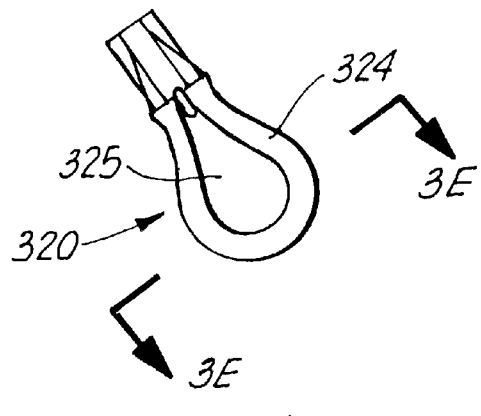
Figure 3C:
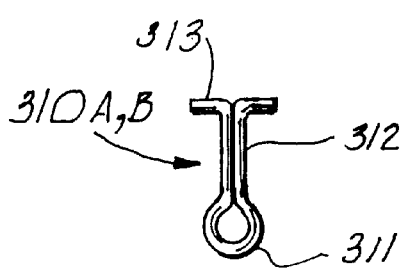
FIG. 3C is side, close-up view of an exemplary, eyelet wire form used for the hook and line attachments for the generalized lure of FIGS. 1A & 1B and assembled within the bib/insert embodiment of FIG. 3A.

As can best be seen in FIG. 3C, the eyelets 310A, 310B each includes a distal, terminus ring 311, an extended base 312 and proximal, terminus feet 313, all preferably integrally formed from a continuous wire form. Thus, for this continuous wire form, a wire is bent about itself to form a circle or terminus ring 311 at its distal end to which a hook or line can be easily attached and held, going into two, side-by-side wire sections producing the extended base or stem 312, terminating in the proximal, terminus, preferably orthogonal "feet" 313.

As can best be seen in FIG. 3D, the bib member 320, which is integrally formed with the insert 300, includes a forward, curved portion or "bib," which interacts with the water flow to cause the lure 1 to travel at a desired depth, depending, for example, on what particular angle it makes with respect to the general line of travel, which typically would be along the center line of the lure body 2.

Figure 3E:
FIG. 3E is a cross-sectional view of the bib element or portion, taken along section lines A—A of FIG. 3D, at the maximum width area of the bib element.

As likewise can be seen in FIG. 3D, the bib member 320 is extended in its longitudinal dimension, with a somewhat flattened or oblong (i.e., non-circle), curved leading end tapering out to a small radii 324 along its peripheral edge (note FIG. 3E), producing a slanted side edge terminating in a peripheral line, in contrast to the flat bibs with the flat, ninety (90°) degree or squared-off side edges of the prior art. As also can be seen in FIG. 3E, the front side of the bib preferably is flat, while the back side has the side edges tapering to a thin, preferably a line edge. The main, extended body 325 of the bib member 320 has an exemplary, preferred thickness in its interior 325 of about one-tenth (0.100") of an inch at its thickness point, believed to be substantially less than that of the plastic bibs of the prior art.

In the initial manufacturing assembly of the components of the combined bib/insert structure 300/310/320, the wire forms for the eyelets 310A & 310B are placed into preformed areas of the mold for the integrated insert member or portion 300 and the bib member or portion 320 to be molded together as an integrated whole. As explained more fully below, the wire form members are initially assembled and integrated together into the insert and bib 300/320 in an initial molding step using insert molding preferably with a thermoplastic, which assemblage is then subsequently preferably molded into a soft plastic body in the desired form or fish configuration 2.

[Exemplary dimensions for the insert member 300, the eyelets 310 and the bib member 320 are included in FIGS. 3A–3F, which dimensions are incorporated herein by reference.]

Bib/Insert Embodiment of FIGS. 4A–4F

Figure 4F:
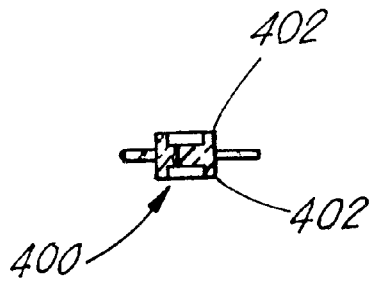
FIG. 4F is a cross-sectional view of the insert element at its approximate mid-section, taken along section lines B—B of FIG. 4A, of the embodiment of FIG. 4A.
Figure 4C:
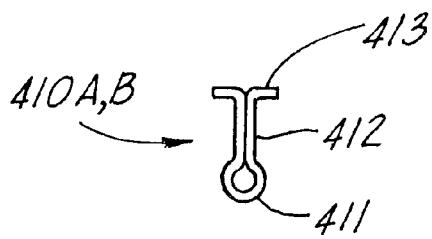
FIG. 4C is side, close-up view of an exemplary, eyelet wire form used for the hook and line attachments for the generalized lure of FIGS. 1A & 1B and assembled within the bib/insert embodiment of FIG. 4A.
Figure 4B:
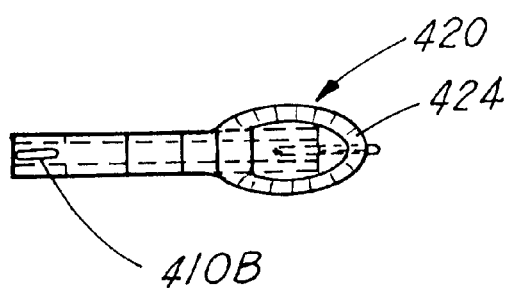
FIG. 4B is a bottom edge view of the insert embodiment of FIG. 4A.
Figure 4D:
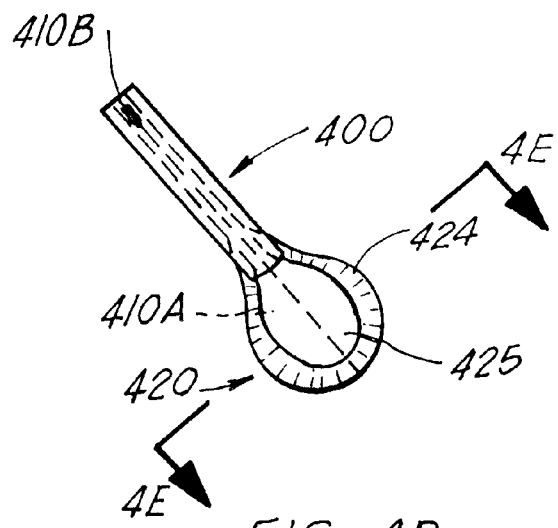
Figure 4A:
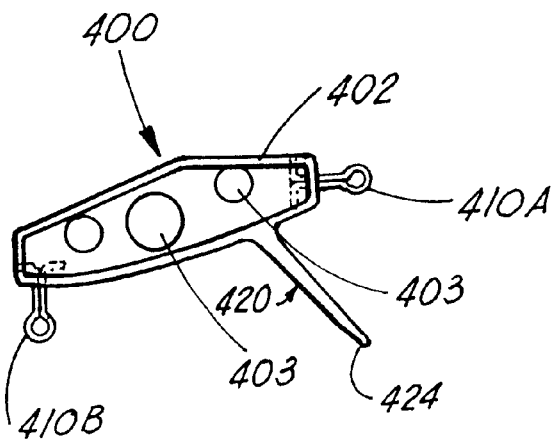
FIG. 4A is a side view of the combined bib, eyelet and insert members of a third, alternative, exemplary embodiment of the bib/insert structure of the present invention which can used within the generalized lure of FIGS. 1A & 1B.

With reference to FIGS. 4A–4F, the third, alternative, exemplary insert member 400 of the present invention likewise also includes two eyelets 410 and a bib member 420. The insert member 400 is generally flat, having an exemplary, over-all, extended, angular shape with reversed symmetry about a "vertical" axis when viewed from its sides as seen in FIG. 4A, but with a strengthening rib 402 (note FIG. 4F) extending along its periphery. The insert member 400 is generally extended in the longitudinal direction, with the first eyelet 410A at its front end "nose" or tip and the second eyelet 410B at its bottom toward its rear end. The bib member 420 extends down at an exemplary angle of about Forty-nine (49°) degrees from the "horizontal." The main body of the insert member 400 includes holes 403, through which the final over-molded plastic passes in the second, over-molding step, as explained more fully below.

As can best be seen in FIG. 4C, the eyelets 410A, 410B each includes a distal, terminus ring 411, an extended base 412 and proximal, terminus feet 413, all preferably integrally formed from a continuous wire form. Thus, for this continuous wire form, a wire is bent about itself to form a circle or terminus ring 411 at its distal end to which a hook or line can be easily attached and held, going into two, side-by-side wire sections producing the extended base or stem 412, terminating in the proximal, terminus, preferably orthogonal "feet" 413.

As can best be seen in FIG. 4D, the bib member 420, which is integrally formed with the insert 400, includes a forward, curved portion or "bib," which interacts with the water flow to cause the lure 1 to travel at a desired depth, depending, for example, on what particular angle it makes with respect to the general line of travel, which typically would be along the center line of the lure body 2.

Figure 4E:
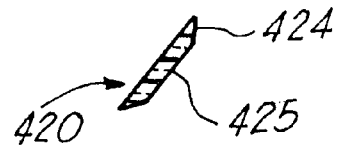
FIG. 4E is a cross-sectional view of the bib element or portion, taken along section lines A—A of FIG. 4D, at the maximum width area of the bib element.

As likewise can be seen in FIG. 4D, the bib member 420 is extended in its longitudinal dimension, with a somewhat flattened or oblong (i.e., non-circle), curved leading end tapering out to a small radii 424 along its peripheral edge (note FIG. 4E), which is integrally formed with the insert 400, in contrast to the flat bibs with the flat, ninety (90°) degree or squared-off side edges of the prior art. As also can be seen in FIG. 4E, the front side of the bib preferably is flat, while the back side has the side edges tapering to a thin, preferably a line edge. The main, extended body 425 of the bib member 420 has an exemplary, preferred thickness in its interior 425 of about one-tenth (0.100") of an inch at its thickest point, believed to be substantially less than that of the plastic bibs of the prior art.

In the initial manufacturing assembly of the components of the combined bib/insert structure 400/410/420, the wire forms for the eyelets 410A & 410B are placed into preformed areas of the mold for the integrated insert member or portion 400 and the bib member or portion 420 to be molded together as an integrated whole. As explained more fully below, the wire form members are initially assembled and integrated together into the insert and bib 400/420 in an initial molding step using insert molding preferably with a thermoplastic, which assemblage is then subsequently preferably molded into a soft plastic body in the desired form or fish configuration 2.

[Exemplary dimensions for the insert member 400, the eyelets 410 and the bib member 420 are included in FIGS. 4A–4F, which dimensions are incorporated herein by reference.]

Exemplary, over-all lengths for the finished lures are two, three and four (2", 3" & 4") inches, as represented by the exemplary, currently preferred embodiments of FIGS. 2A+, 3A+ & 4A+, respectively, although, of course, many other lengths could be used.

Manufacturing Methodology

Figure 5:
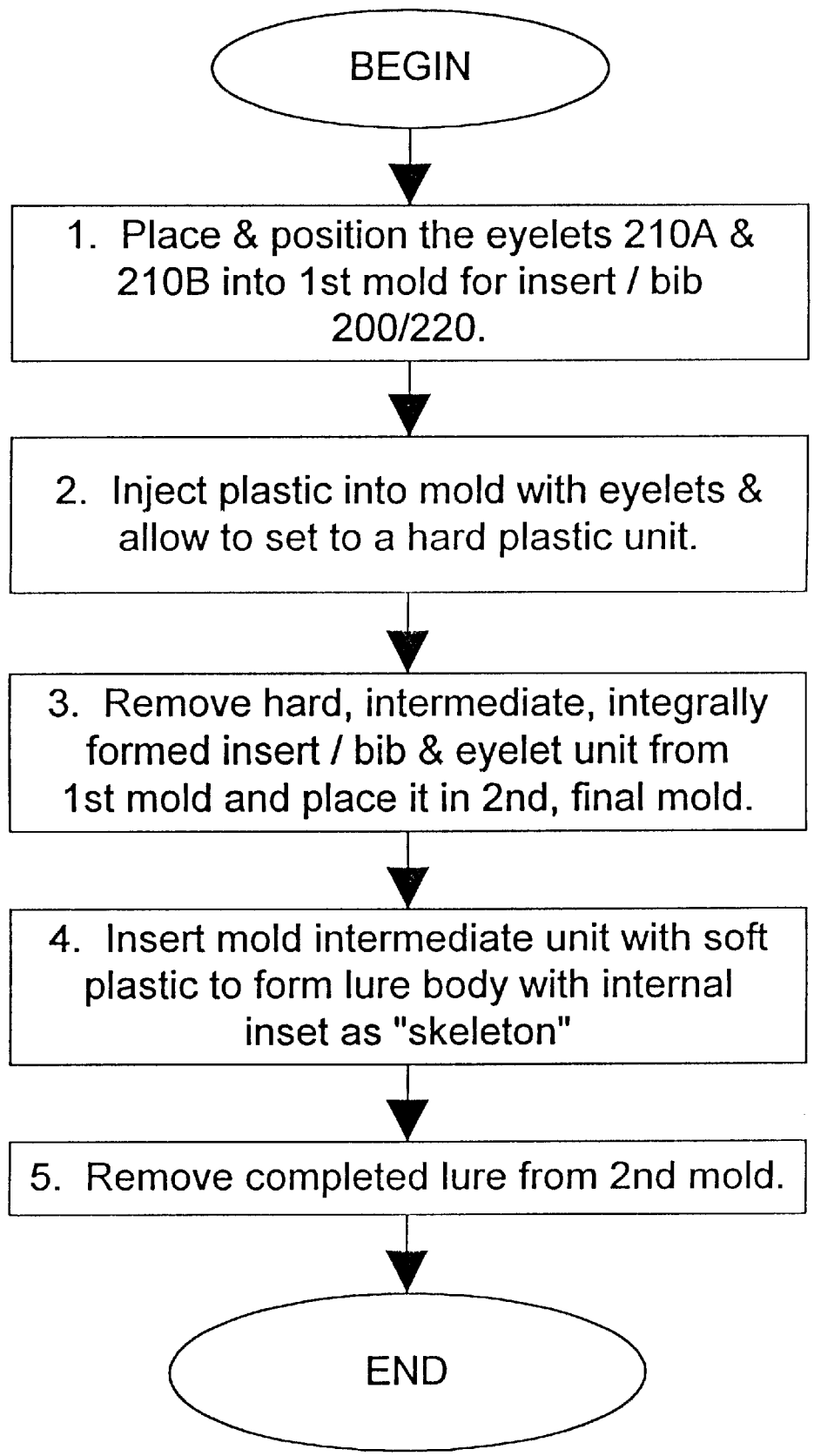
FIG. 5 is a flow chart, outlining the basic manufacturing methodology of the exemplary preferred embodiment of the present invention.

In the initial lure manufacturing process and also with reference to FIG. 5, the two, wire forms 210A, 210B (310A & B, 410A & B) for the two eyelets 5 & 6 are placed and appropriately positioned, placing the bases of the two wire forms, one wire form at a right angle to the other but with both located in the same plane as the other, in a first, smaller mold for the integrated insert 200 (300, 400) and bib 220 (320, 420). A thermoplastic, e.g., clear polycarbonate, is injected into the mold under high pressure, producing the then integrated wire forms 210A, 210B (310A & B, 410A & B), insert 200 (300, 400) and bib 220 (320, 420) surrounded and held together by the set plastic, resulting in a rigid, skeleton piece 8, with the main portions of the bib and the eyelet ends of the wire forms extending out away from the main mass of the insert 200 (300, 400).

The initial mold is configured to produce the desired bib shape, as described above, i.e., relatively narrow and oblong with a slanted side, peripheral, line edge, extending down at an exemplary angle within the range of about forty-nine to about sixty-five (~49–65°) degrees from the "horizontal," i.e., from the center-line of the fish lure body.

The clear, rigid, skeleton piece 8 is then insert molded in a further, larger, second mold, which produces the properly configured, preferably soft lure body 2 having the desired characteristics of the marine animal or fish, including other type marine shapes, such as a worm, grub, frog, etc., that the lure 1 is intended to simulate, with the main portions of the bib 220 (320, 420) and the eyelet ends appropriately extending out side of the exterior body 2 of the lure 1. This second, over-molding process preferably uses, for example, a plastisol compound using the liquid injection molding (LIM) process. Alternatively, one could also use, for further example, an injection molded, low durometer thermoplastic elastomer (TPE), such as, for example, polyurethane, with the second mold preferably including the configurations to produce the slots 3 and the web members 4, producing a jointed lure with a life-like "swimming" action.

The general plastic molding techniques of the first molding step and of the second, over-molding step are well know to those of ordinary skill in the general art of plastic molding, and therefore, are not discussed in detail. However, the two step process of initially hard molding of the integrated wire forms 210A, 210B (310A & B, 410A & B), insert 200 (300, 400) and bib 220 (320, 420) surrounded and held together by the set plastic in a rigid, skeleton piece 8 and then over-molding it into the soft body plastic produced in the second molding step to produce the highly advantageous fishing lure 1 of the present invention are, it is believed, unique and part of the present invention.

As previously noted, the lures can be made in different lengths, different body configurations, and with differently sized and configured bibs to meet the varying needs and applications of, for example, sports fishermen.

It is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A method of manufacturing a fishing lure having an exterior body, a skeleton insert, a bib and at least one eyelet, comprising the steps of:
   (a) placing the base of at least one wire form having the at least one eyelet at its distal end into a first mold configured to produce the insert and bib of said fishing lure in an integral manner;
   (b) injecting plastic into the first mold with the base of the at least one wire form in it, and, by injection molding, producing an integrated insert, bib and eyelet structure using a thermoplastic which hardens to a rigid, skeleton mass smaller in size than the final body of the fishing lure; and
   (c) insert molding the rigid mass formed in the step (b) into an exterior body of a different thermoplastic using a second mold larger than the first mold, producing the exterior body of the lure, with portions of the bib and the at least one eyelet extending outside of said exterior body.

2. The method of manufacturing a fishing lure of claim 1, wherein there is included in the step (c) a step of:
   producing a soft, exterior body over said rigid skeleton mass.

3. The method of manufacturing a fishing lure of claim 2, wherein there is included in the step (c) a step of:
   using a plastisol compound and liquid injection molding to produce the soft, exterior body over said rigid skeleton mass.

4. The method of manufacturing a fishing lure of claim 2, wherein there is included in the step (c) a step of:
   using an injection molding low durometer thermoplastic elastomer to produce the soft, exterior body over said rigid skeleton mass.

5. The method of manufacturing a fishing lure of claim 1, wherein there is included in the step (e) a further step of:
   configuring the second, larger mold to produce in the molding process of step (c) at least one, opposed set of slots in the sides of the lure body producing a central web between the slots, serving effectively as a hinge between the adjacent, in-line parts of the lure body for an enhanced swimming action for the lure as it is pulled through the water.

6. The method of manufacturing a fishing lure of claim 1, wherein there is included in the step (b) a further step of:
   using injection molding under high pressure of a thermoplastic to produce the rigid skeleton mass.

7. The method of manufacturing a fishing lure of claim 6, wherein there is included in the step (b) a further step of:
   using clear polycarbonate as the thermoplastic.

8. The method of manufacturing a fishing lure of claim 1, wherein in there is included in the step (a) a further step of:
   configuring the first mold so that a rib is produced about the periphery of the internal insert portion of the rigid skeleton mass produced in the step (b).

9. The method of manufacturing a fishing lure of claim 1, wherein in the step (a) there is included a further step of:
   placing the bases of at least two of the wire forms in said first mold, spaced apart from one another but with both located in the same plane as the other.

* * * * *